(No Model.)
C. R. JENNE.
ANIMAL TRAP.
No. 442,228. Patented Dec. 9, 1890.
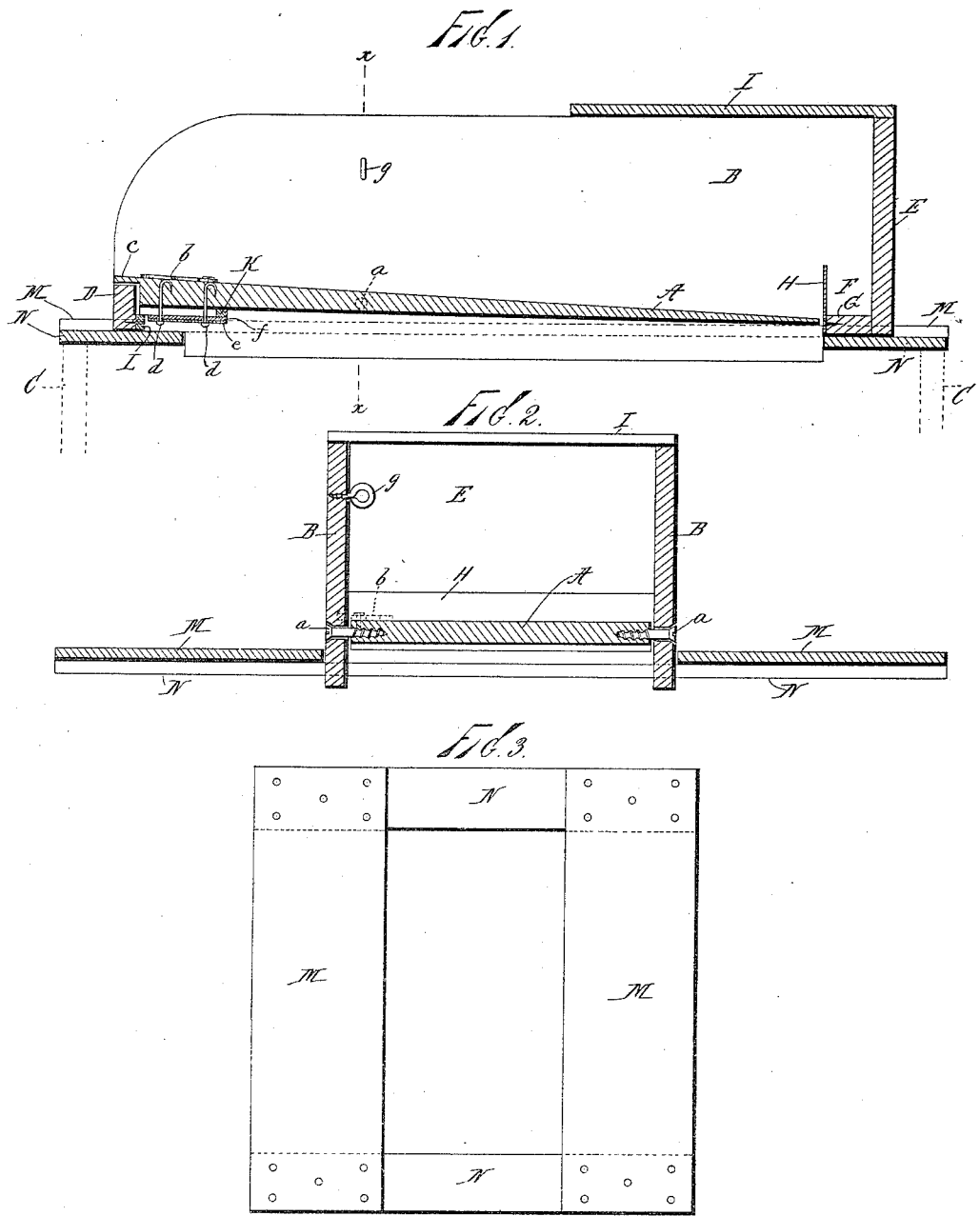
Witnesses:
John Buckle,
L. H. Osgood.
Inventor:
C. R. Jenne,
By Worth Osgood,
Attorney.

United States Patent Office.

CHANCY R. JENNE, OF FORT WAYNE, INDIANA.

ANIMAL-TRAP.

SPECIFICATION forming part of Letters Patent No. 442,228, dated December 9, 1890.

Application filed June 17, 1890. Serial No. 355,714. (No model.)

*To all whom it may concern:*

Be it known that I, CHANCY R. JENNE, of Fort Wayne, county of Allen, and State of Indiana, have invented certain new and useful Improvements in Animal-Traps, of which the following is a full, clear, and exact description, reference being had to the accompanying drawings, and to the letters of reference marked thereon.

My invention relates to traps intended for catching rats, mice, and small animals, and has for its object the production of a simple, cheap, durable, and automatically-resetting trap, whereof the several parts are easy and cheap to make and assemble for use, occupying but little room, easily packed for shipment, and not liable to get out of order. To accomplish all of this and to secure other and further advantages in the matters of construction, operation, and use, my improvements involve certain new and useful arrangements or combinations of parts and peculiarities of construction or details of manufacture, all of which will be herein first fully described, and then pointed out in the claim.

In the accompanying drawings, forming part of this specification, Figure 1 is a vertical section and elevation of my improved trap and base part. Fig. 2 is a cross-section and elevation upon a plane through line $x\ x$ of Fig. 1, and further includes an elevation of the retaining-hook for the tilting bottom. Fig. 3 is a plan view showing the base part as it appears when the trap is detached therefrom, the view being on a scale about half that of previous figures.

In all the figures like letters of reference wherever they occur indicate corresponding parts.

A is the bottom board or tilt of the trap, hinged between the two side boards B B, the hinge being made of two screws $a\ a$, driven through the side boards into the material of the bottom board. These screws are easily adjusted by turning one in and the other out until the tilt or bottom swings clear of the side boards, the screws acting as pivots on which the tilt swings. The parallel side pieces are held in position by two end pieces D and E, of which the latter is of the same width as the side boards at the ends and the former is about an inch wide.

F is a feed or bait trough, of which the back board E forms one side, a narrow strip G, secured between the side boards, the bottom, and a thin strip H, as of tin, the front wall, this latter being secured on the front edge of strip G. Over the bait-trough and covering the back part of the trap is a cover-piece I, of width sufficient to prevent any animal from reaching the bait in the trough without approaching it by traveling on the bottom board.

The tilt is, when desired, held secure by a hook $b$, preferably located at the front end and on top of the tilt, as shown, and arranged so that it can be turned to enter a perforation in the adjacent side board. The tilt is thus held for a time, in order that the bait may be reached and the animals accustomed to enter the trap without alarm. When the hook is withdrawn, (and the trap ready for operation,) the tilt is held apparently secure by a magnet K, which is attached to its under side near the front end, the poles of the magnet resting upon an armature L, attached to the inside of the narrow front end piece.

The object of the magnet is to hold the tilt in position until the decoyed animal has advanced so far beyond the pivots or hinge that his weight overcomes the force of the magnet, when the tilt instantly swings to a vertical position, letting the animal fall by his own weight. After this the tilt automatically returns to its former position and is again held by the magnet.

The tilt is made tapering from front to rear, as shown in Fig. 1, and has an offset or projection $c$ at its front end. The object of this projection is to protect the magnet and armature from rain and from crumbs and litter, so that a good contact between the two may always be made.

The object in tapering the tilt is to make the front end heavier than the other, so that it will automatically return to its set position and so that the pivots can be set nearer the front, giving the rear end and thinner part more leverage over the front end, and thus permitting the trap to be sprung by lighter animals.

The magnet is secured in place with clinch-nails, as $d$, driven through a small piece of tin, as $e$, then through a piece of leather or paper, as $f$, and through the tilt between the branches of the magnet and clinched on top of tilt. The paper or leather insulates the magnet from the outer protecting-piece of tin, and the clinch-nails prevent the magnet from being detached or disarranged.

A stop $g$ on the inside of the trap and near the top prevents the the tilt from swinging beyond the vertical line. This stop may be in the form of a screw-eye, as shown or a double-pointed tack makes a very good stop and one easy to apply.

The trap thus made is intended to be mounted over a cask or other vessel, as indicated by the dotted lines C C in Fig. 1. To sustain the trap on the vessel, I provide a base for the trap, which is at the same time a cover for the vessel. This base is made of four pieces, as shown, the side pieces M M being separated from each other the width of the outside of the trap and secured upon the narrower end pieces N N, which come under the ends of the trap. The trap is held securely in place on this structure by cutting away the lower corners of the side pieces, as shown in Fig. 1, and setting the trap in the opening between the pieces M M and N N.

The cover for the cask and base for the trap is made separable from the trap, so that the parts may be separately packed for shipment with convenience and economy of space, which will be appreciated when any considerable number is to be packed and shipped.

The improved trap may be made of almost any size and for catching various sizes and kinds of animals.

Having now fully described my invention, what I claim as new herein, and desire to secure by Letters Patent, is—

An animal-trap having vertical sides, an elongated tapering platform pivoted therein, a rear inclosed end, a bait-receptacle within the same, a magnet secured to the under side of the outer enlarged end of the platform, a sill having a keeper on its inner side for engaging the magnet, an offset or projection on said platform to rest upon the upper face of said sill, a stop on one of the sides to arrest the revolution of the platform when in operation, and a detachable base having a central opening, into which the sides of the trap project for engagement therewith, said base adapting the structure for support upon and access to a suitable vessel.

In testimony that I claim the foregoing I have hereunto set my hand in the presence of two witnesses.

CHANCY R. JENNE.

Witnesses:
CHESTER SCARLET,
JAMES E. GRAHAM.